United States Patent [19]

Nagano et al.

[11] Patent Number: 5,058,550

[45] Date of Patent: Oct. 22, 1991

[54] METHOD FOR DETERMINING THE CONTROL VALUES OF A MULTICYLINDER INTERNAL COMBUSTION ENGINE AND APPARATUS THEREFOR

[75] Inventors: Masami Nagano; Takeshi Atago, both of Katsuta, Japan

[73] Assignee: Hitachi, Ltd., Tokyo, Japan

[21] Appl. No.: 537,076

[22] Filed: Jun. 12, 1990

[30] Foreign Application Priority Data

Jun. 12, 1989 [JP] Japan .................................. 1-146598

[51] Int. Cl.$^5$ .............................................. F02P 5/15
[52] U.S. Cl. .................................... 123/422; 123/417; 123/492
[58] Field of Search ............... 123/416, 417, 418, 422, 123/478, 480, 486, 491, 492, 612, 643

[56] References Cited

U.S. PATENT DOCUMENTS

| | | | |
|---|---|---|---|
| 4,596,220 | 6/1986 | Oosuga et al. | 123/478 |
| 4,682,577 | 7/1987 | Kato et al. | 123/422 X |
| 4,729,358 | 3/1988 | Morita et al. | 123/417 X |
| 4,785,783 | 11/1988 | Oshiage et al. | 123/417 |
| 4,827,886 | 5/1989 | Maeda | 123/643 X |
| 4,844,042 | 7/1989 | Osano | 123/492 |
| 4,879,656 | 11/1989 | Quigley et al. | 123/417 X |
| 4,941,449 | 7/1990 | Höptner et al. | 123/491 X |
| 4,947,816 | 8/1990 | Nakaniwa et al. | 123/422 |
| 4,960,093 | 10/1990 | McDougal et al. | 123/643 X |

FOREIGN PATENT DOCUMENTS

0008339 1/1989 Japan .
0121569 5/1989 Japan .

Primary Examiner—Willis R. Wolfe
Attorney, Agent, or Firm—Antonelli, Terry, Stout & Kraus

[57] ABSTRACT

With regard to the engine control method which determines control variables for the individual cylinders of a multicylinder internal combustion engine independently of one another, this specification discloses improved control method and apparatus whereby the optimum control variables are determined. The control method of a multicylinder internal combustion engine according to this invention includes a step of detecting data representing the operating condition of the engine, a step of storing data, a step of determining a first control variable at a certain time of a certain stroke of each cylinder according to the stored data, and a step of determining a second control variable at a later time in the stroke according to the same stored data. A control apparatus of a multicylinder internal combustion engine according to this invention includes a device for detecting data representing the operating condition of the engine, a memory device for storing data, a device for calculating a first controlled variable at a certain time of a certain stroke of each cylinder according to data in the memory device, and a device for determining a second controlled variable at a later time in said stroke according to the same data in said memory device.

5 Claims, 8 Drawing Sheets

FIG. 9B
INJ / ADV
PROCESS INTERRUPT

FIG. 10A

FIG. 10B
INJ/ADV PROCESS INTERRUPT

METHOD FOR DETERMINING THE CONTROL VALUES OF A MULTICYLINDER INTERNAL COMBUSTION ENGINE AND APPARATUS THEREFOR

BACKGROUND OF THE INVENTION

This invention relates to an improved control method and apparatus in which the control values of the individual cylinders of a multicylinder internal combustion engine are determined independently of one another, and particularly to a control method and apparatus suitable for controlling the ignition timing of a gasoline engine of an automobile incorporating a fuel injection control device which is computerized and electronically controlled.

A spark ignition engine, especially a gasoline engine of an automobile, must satisfy a severe exhaust gas regulation and at the same time, is required to have a sufficiently high performance. In recent years, control apparatuses have come to be adopted which are of the type that receives various kinds of data representing the operating condition of the engine one after another, and according to these data, calculates specified control data for the individual cylinders, and controls the supplied fuel quantities and ignition timing of the cylinders independently of one another. An example of such a control system is disclosed in Japanese Patent Application laid-open No. JP-A-56-92330 filed by HITACHI, LTD., for instance.

Meanwhile, in the control apparatuses of this conventional type, various kinds of data representing the operating condition of the engine are entered one after another as time elapses and are updated in a regular sequence, and according to the updated data, controlled variables such as fuel injection quantity and ignition timing are calculated in a regular sequence.

The problem with the conventional control method is as follows. In a cycle (suction stroke-compression stroke combustion stroke-exhaust stroke) in a certain cylinder, if the operating condition of the engine changes between a given sampling time of data and a subsequent sampling time, the supplied fuel flow is determined according to data at the previous sampling time, and the ignition timing is determined according to data at the subsequent sampling time. This means that an ignition timing cannot be obtained which adequately corresponds to the intake air quantity of that cycle. If, for example, the engine is accelerated suddenly, knocking or misfire will result from the inadequate ignition timing. The knocking or misfire increases components of NOx and HC in the exhaust gas, and causes drivability deterioration by a change in torque and increases the fuel consumption.

Known literature about control technology of the internal combustion engine includes Japanese Patent Application laid-open No. JP-A-64-8339 filed by Fuji Heavy Industries, Ltd. on June 30, 1987 and laid open on Jan. 12, 1989; JP-A-1-125566 filed jointly by Nissan Motor Co., Ltd. and Hitachi, Ltd. on Nov. 9, 1987 and laid open on May 18, 1989; JP-A-1-125567 filed on Nov. 11, 1987 by Hitachi, Ltd. and laid-open on May 18, 1989; JP-A-1-285641 filed on May 9, 1988 by Eagle Industries Co., Ltd. on May 9, 1988 and laid open on Nov. 16, 1989; JP-A-1-121569 filed on Nov. 2, 1987 by Fuji Heavy Industries, Ltd. and laid open on May 15, 1989; U.S. Pat. No. 4,596,220 granted to Oosuga et al. on June 24, 1986; U.S. Pat. No. 4,167,923 granted to Iwase et al. on Sept. 18, 1979; and U.S. Pat. No. 4,690,122 granted to Sasakura et al. on Sept. 1, 1979.

SUMMARY OF THE INVENTION

The object of this invention is to provide an improved control method and apparatus whereby the optimum controlled variables are determined in the field of the engine control method which determines control variables for the individual cylinders independently of one another in a multicylinder internal combustion engine.

The control method of a multicylinder internal combustion engine according to this invention comprises a step of detecting data representing the operating condition of the engine, a step of storing data, a step of determining a first control variable at a certain time of a certain stroke of each cylinder according to said stored data, and a step of determining a second control variable at a later time in said stroke according to the same stored data.

A control apparatus of a multicylinder internal combustion engine according to this invention includes a device for detecting data representing the operating condition of the engine, a memory device for storing data, a device for calculating a first control variable at a certain time of a certain stroke of each cylinder according to data in said memory device, and a device for determining a second control variable at a later time in said stroke according to the same stored data.

According to this invention, it is possible to determine adequate controlled variables in a cycle by using data used in determining a first control variable again for determining a second control variable later in a complete cycle.

For example, when this invention is applied to an ignition timing control method of an engine, in case the engine speed changes suddenly during acceleration or deceleration, the common data obtained at the same time is used for determining both the values of fuel flow rate and ignition timing in a complete cycle, so that a value of optimum ignition timing corresponding to the load quantity and the engine speed can be determined. Therefore, a misfire or knocking can be prevented, thus obviating an increase in the regulated components in the exhaust gas, drivability deterioration, and fuel consumption increase.

This invention can be applied not only to the ignition timing control method, which will be described below, but also to methods of determining other control parameters.

DESCRIPTION OF THE PREFERRED EMBODIMENTS

An ignition timing control apparatus of an internal combustion engine according to this invention will be described in detail with reference to the embodiments illustrated.

Figure 1:
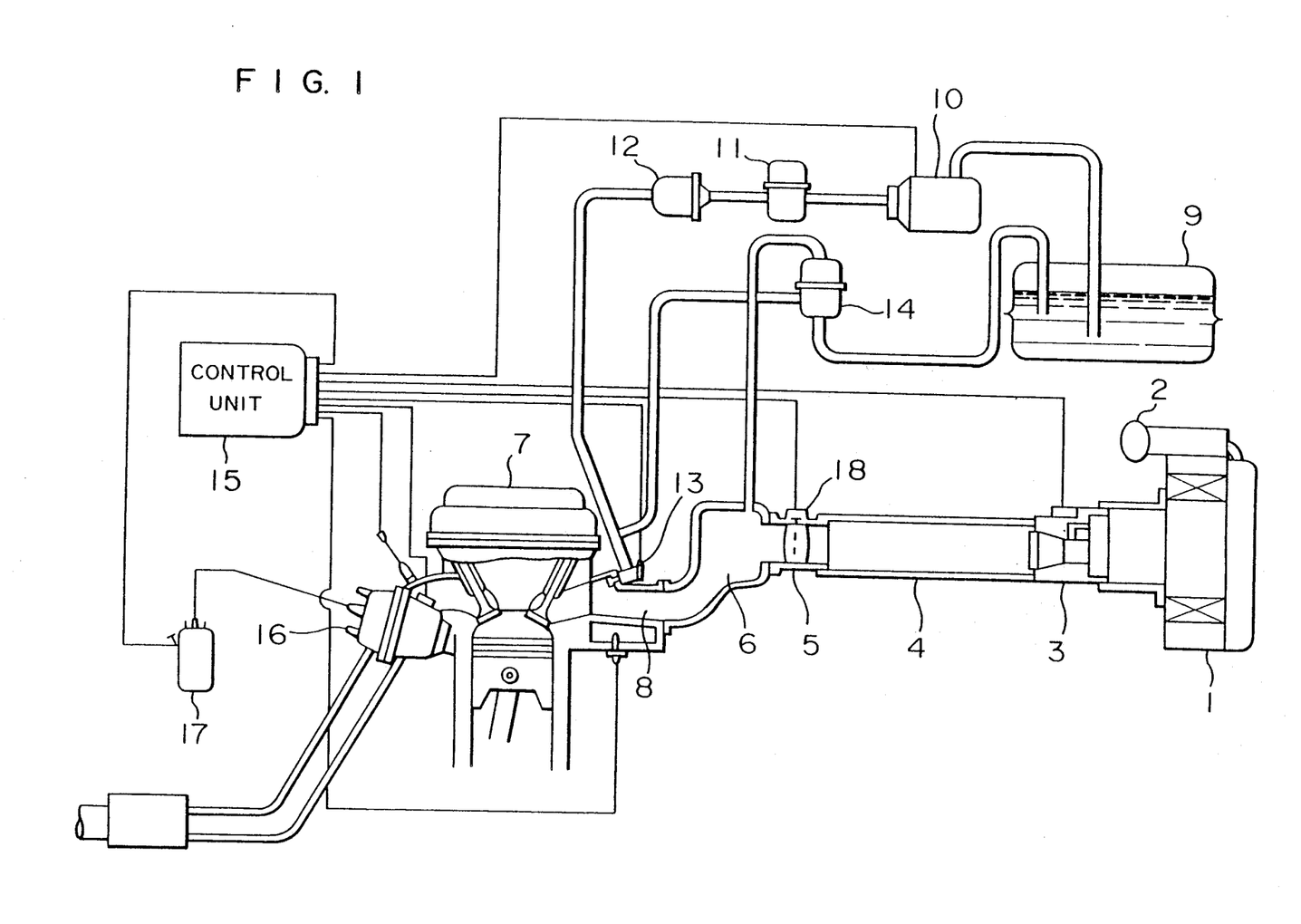
FIG. 1 is a construction diagram showing an example of an engine control system in which a first embodiment of the ignition timing control apparatus according to this invention is applied.

FIG. 1 is an example of an engine control system in which this invention is applied. In FIG. 1, air which is drawn in by the engine enters through an entry opening 2 of an air cleaner 1. The air passes through a hot wire type air flowmeter 3 for detecting the intake air flow, a duct 4, and a throttle body containing a throttle valve to control the intake air flow, and then goes into a collector or an air chamber 6. From this collector 6, the air is distributed into inlet ports 8 connected to the cylinders of an engine 7, and led into the cylinders.

On the other hand, from a fuel tank 9, fuel is sucked and pressurized by a fuel pump 10, and is supplied to the fuel system including a fuel damper 11, a fuel filter 12, a fuel injection valve (injector) 13, and a fuel pressure regulator 14. The fuel is controlled at constant pressure by the fuel pressure regulator 14, and is injected into the inlet ports 8 from the injectors 13 provided at the inlet ports 8.

The air flowmeter 3 outputs signals representing the intake air flow rate, and the signals are input into a control unit 15.

The throttle valve 5 is connected with a throttle sensor 18 to detect the opening angle of the throttle valve 5. Output signals from the throttle sensor 18 are input into the control unit 15.

Then, a distributor 16 has a crank angle sensor 19 built in, and the crank angle sensor 19 outputs a reference angle signal REF representing the rotational position of the crankshaft and an angle signal POS for detecting the rotating speed (number of revolutions). These signals are input into the control unit 15.

Figure 3:
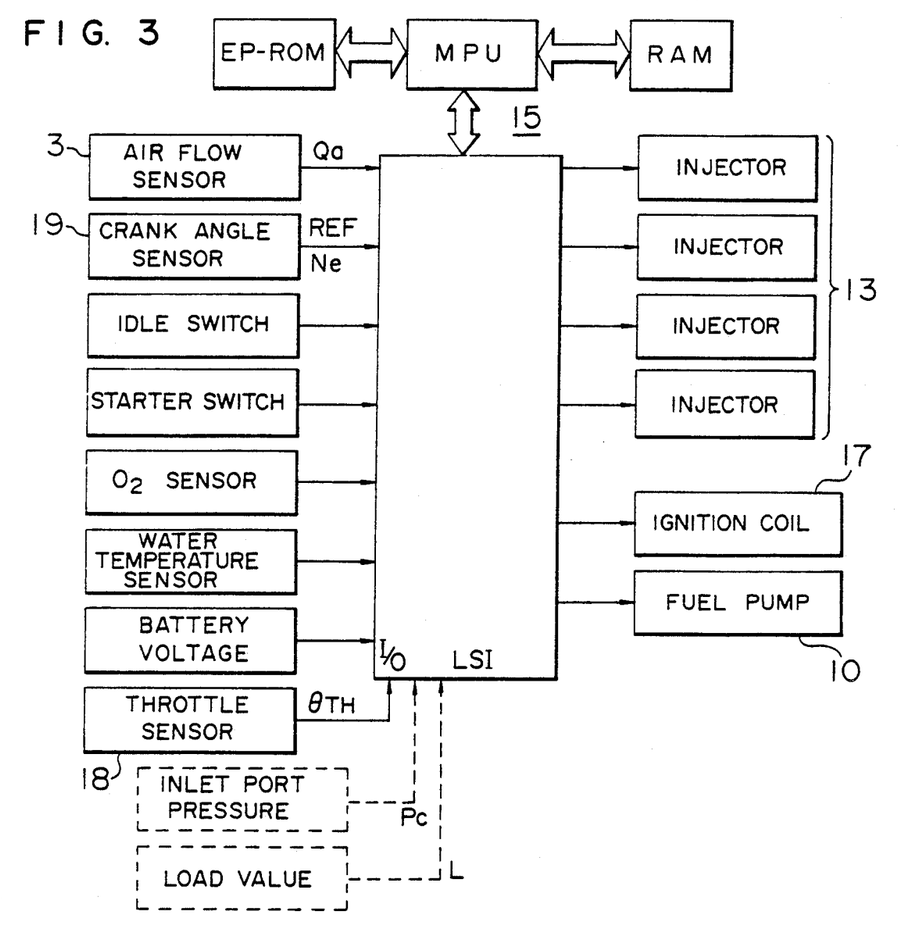
FIG. 3 is a block diagram of the control unit.

As shown in FIG. 3, the main part of the control unit 15 is formed of a microcomputer composed of an MPU, a ROM, and an LSI circuit including an A/D converter, input/output circuits, etc. The control unit 15 receives input signals representing the operating condition of the engine, such as signals from the air flowmeter 3, the distributor 16, and the throttle sensor 18. In addition, the control unit 15 executes specified arithmetic processes, outputs various control signals produced as the result of the arithmetic processes, provides specified control signals to the injector 13 and an ignition coil 17, and controls the fuel supply quantity and ignition timing.

Then, these kinds of control will be described. Referring first to the calculation of the ignition timing, it is calculated using data retrieved from maps having engine speed as abscissa and basic pulse width Tp for the basic values of the fuel injection quantity as ordinates.

Figure 4:
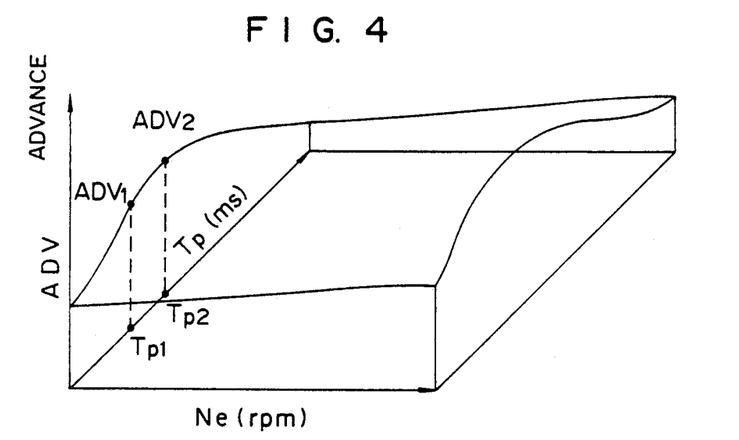
FIG. 4 is an explanatory diagram in analog form of a map used in the first embodiment of this invention.
Figure 5:
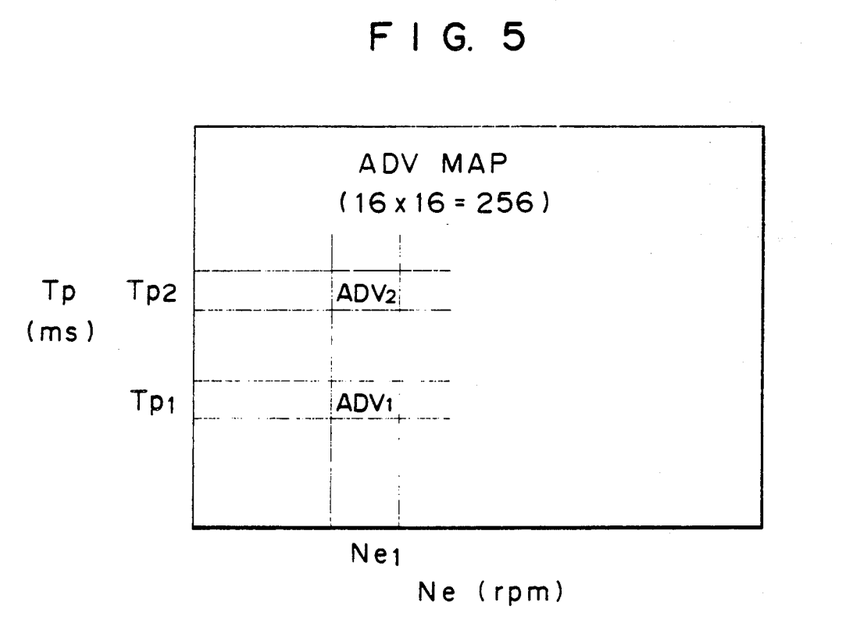
FIG. 5 is an explanatory diagram in digital form of the map.

The maps are shown in FIGS. 4 and 5. FIG. 4 shows a map in analog fashion and FIG. 5 shows a map in digital fashion. These maps show essentially the same thing. The basic pulse width Tp on the axis of ordinates indicates data representing the load on the engine. Therefore, instead of the basic pulse width Tp, it is possible to perform map retrieval by using either the intake air negative pressure Pc or data LDATA directly representing the load on the engine.

Figure 6:
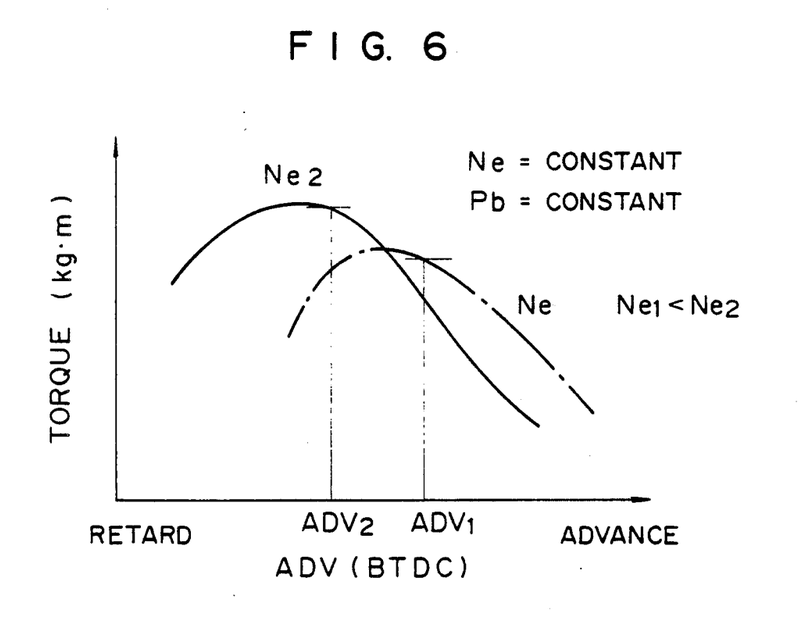
FIG. 6 is a characteristic diagram showing the relation between ignition timing and engine torque.

As shown in FIG. 5, this map is divided into 16 regions both on the axis of ordinates and on the axis of abscissa, and possesses 256 values of data in total. Each region stores a value close to MBT (Minimum Spark Advance for Best Torque) obtainable from the relation between the ignition timing values ADV and the generated torque (shown in FIG. 6) for the engine kept in constant operating condition, which relation is to be measured in advance.

The timing relation between the calculation of the injection quantity and the calculation of ignition timing will be described in detail by comparing an embodiment of this invention in FIG. 2 and the conventional example in FIG. 7.

A microcomputer in the control unit 15 is so arranged as to execute a 10-ms (millisecond) task and two interruption tasks $IRQ_1$ and $IRQ_2$ to calculate the injection quantity and ignition timing. The $IRQ_1$ occurs at a fuel injection timing and the $IRQ_2$ at an ignition timing.

Figure 2:
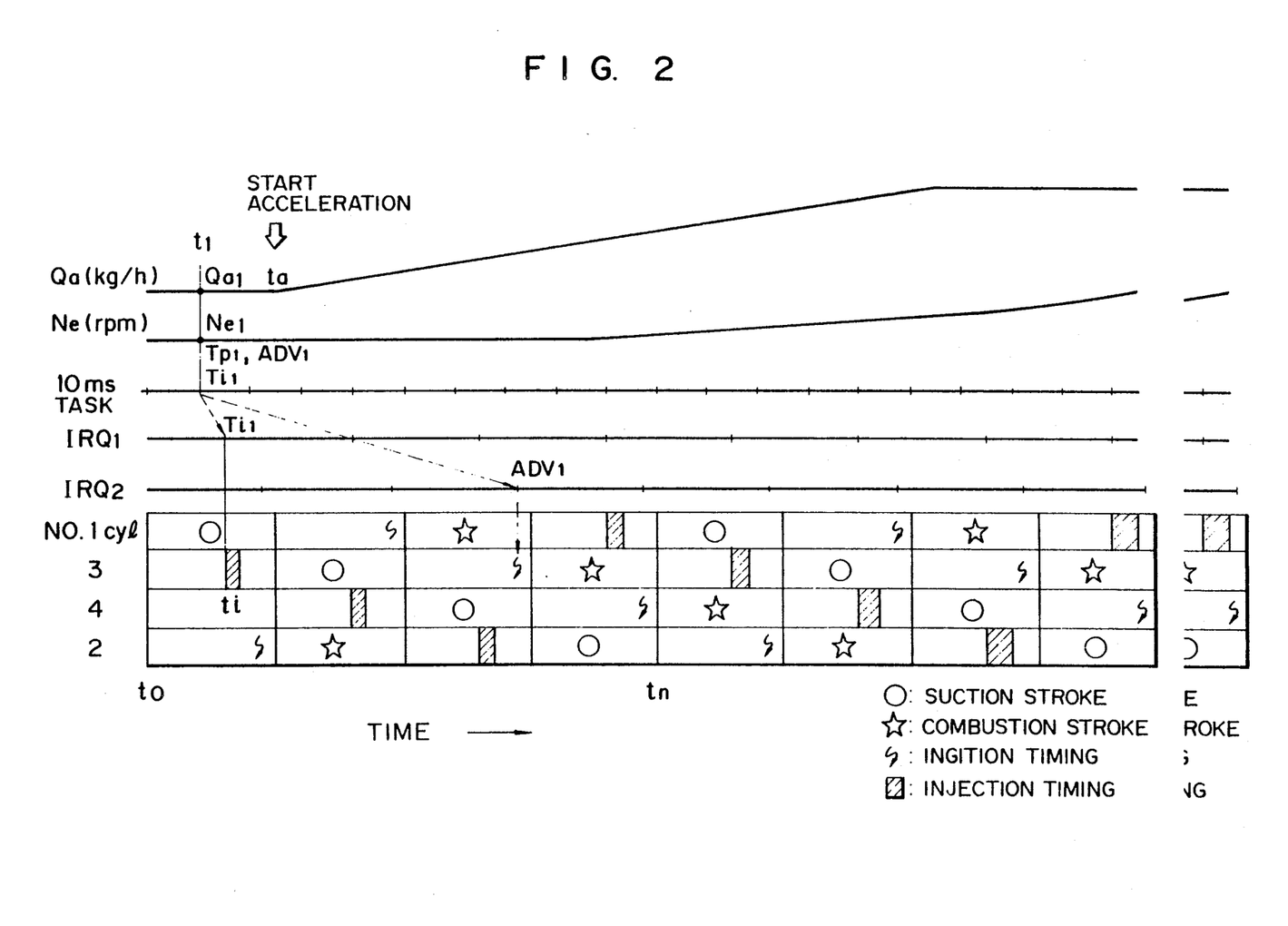
FIG. 2 is a timing chart for explaining the operation of the first embodiment of this invention.
Figure 7:
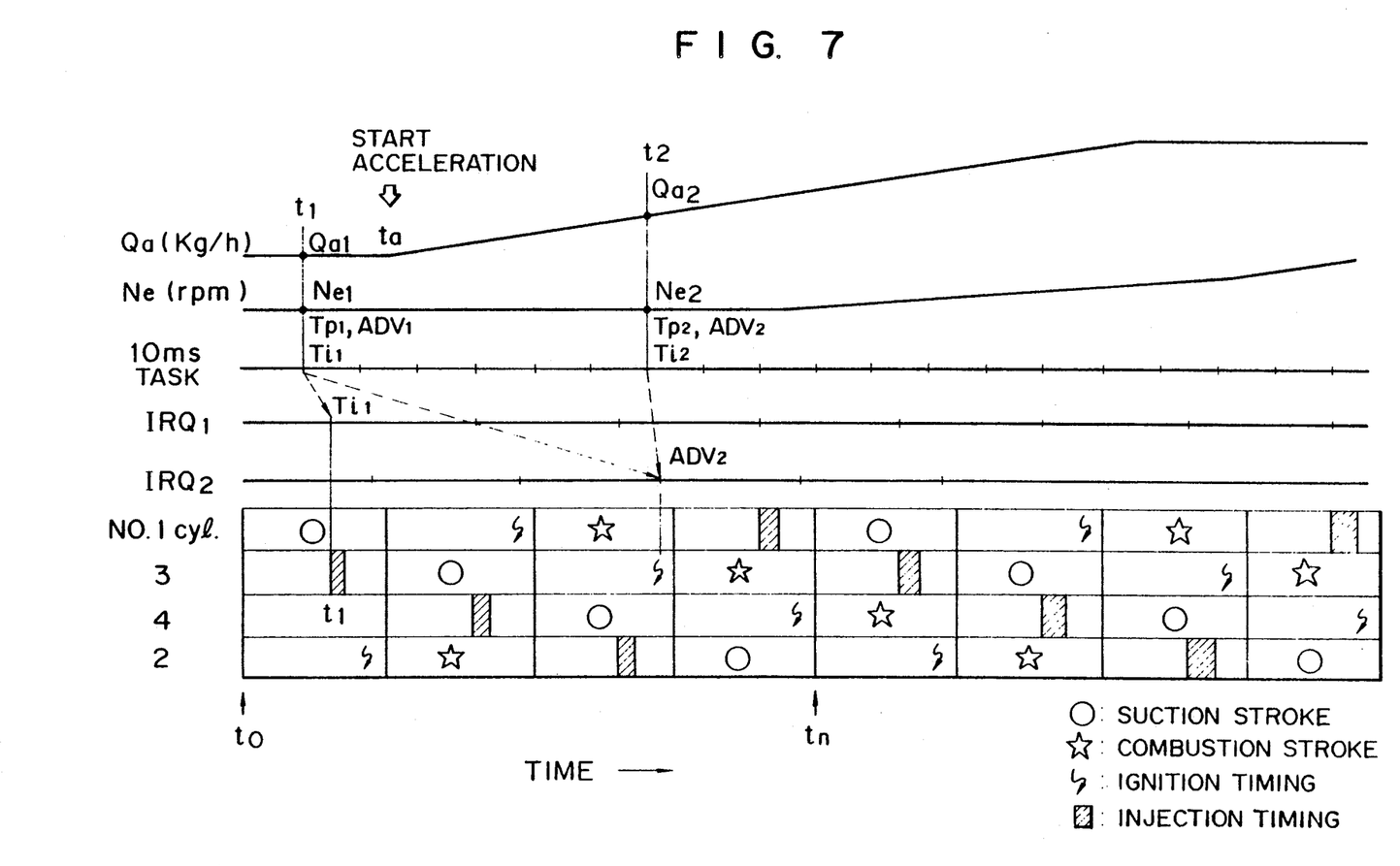
FIG. 7 is a timing chart for explaining the operation of a prior art apparatus.

As can be seen from FIGS. 2 and 7, every 10 ms successively, the microcomputer executes a 10-ms task in which the intake air flow and the engine speed Ne are entered, and executes interruption tasks $IRQ_1$ and $IRQ_2$ by which a basic pulse width Tp, an actual fuel injection pulse width Ti, and ignition timing ADV are calculated. In calculating the ignition timing, map retrieval mentioned above is used.

The basic pulse width Tp is the injector driving pulse width which gives the basic fuel injection quantity, and can be expressed by $$Tp = k\frac{Qa}{Ne}$$

where k is a coefficient.

The actual injection quantity is determined by adding a correction value for air-fuel ratio feedback control, a correction value according to the water temperature, and a correction value at starting to the basic injection quantity Tp. This actual injection quantity is expressed by the injection pulse width Ti.

Now, let us take a look at a cycle of the No. 3 cylinder which starts at time $t_0$ and ends at time $t_n$. Referring to, the conventional example of FIG. 7, an injection pulse width $Ti_1$ at a certain injection timing $t_i$ is data calculated according to an intake air flow $Qa_1$ and the engine's number of revolutions $Ne_1$ at a sampling time $t_1$ of the preceding 10-ms task, an ignition timing data $ADV_2$ at the ignition timing in this cycle of the same cylinder is data calculated according to an intake air flow $Qa_2$ and the engine speed $Ne_2$ entered at a sampling time $t_2$ of the 10-ms task immediately before the sampling time $t_1$, that is to say, data based on $Tp_2$ and $Ne_2$.

Incidentally, if no significant change occurs in the operating condition of the engine between times $t_1$ and $t_2$, there is no problem.

However, if, as shown in FIG. 7, the engine is accelerated at time $t_a$ after time $t_1$ by opening the throttle and this causes differences in data representing the operating condition of the engine between sampling times $t_1$ and $t_2$, there arises a great difference in data on ignition timing of this No. 3 cylinder between $ADV_1$ and $ADV_2$. In other words, the number of revolution does not increase at time $t_2$ after acceleration time $t_a$, and as a result, the engine speed data $Ne_1$ and $Ne_2$ are the same. However, the intake air flow Qa changes notably from $Qa_1$ to $Qa_2$. Therefore, $Tp_2$ is greater than $Tp_1$. The ignition timing values ADV retrieved from the data maps of FIGS. 4 and 5 by using data $Tp_1$ and $Ne_1$ at time $t_1$ and data $Tp_2$ and $Ne_2(=Ne_1)$ at time $t_2$, respectively are $ADV_1$ and $ADV_2$, and a spark-advance amount at the ignition timing data $ADV_2$ is large.

Figure 8:
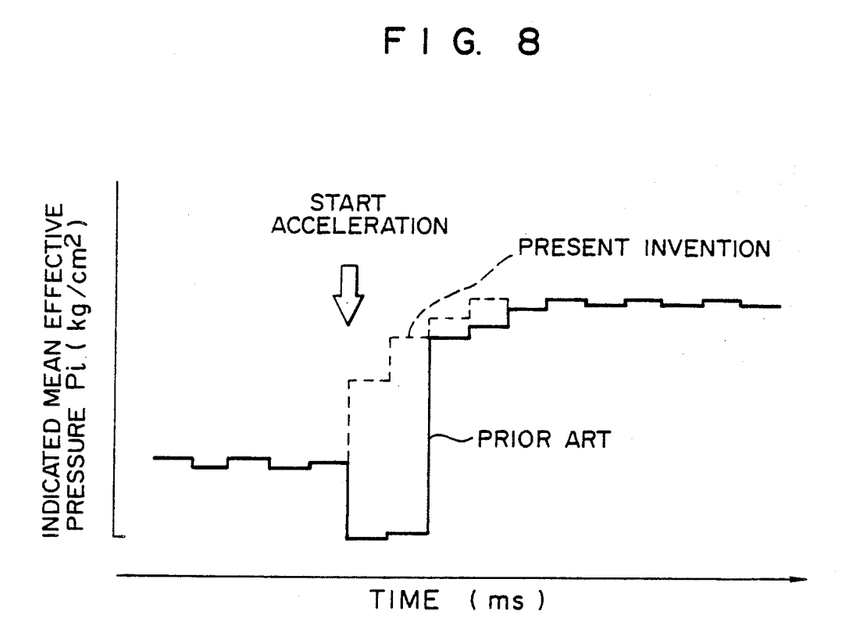
FIG. 8 is a characteristic diagram for explaining the difference between the embodiment of this invention and the conventional example.

In short, the injection quantity in this cycle has been determined by data $Ti_1$, and ignition timing data $ADV_2$ in the same cycle corresponds to data $Ti_2$. The air flow rate sucked in this cycle is $Qa_1$. Therefore, an injection quantity adequate for the intake air flow rate $Qa_1$ before acceleration and an ignition timing value adequate for the intake air flow rate $Qa_2$ during acceleration are given in one cycle. In consequence, just after the engine is accelerated, ignition takes place with an excessive spark advance in the No. 3 cylinder. Therefore, when the intake air flow rate Qa changes suddenly in a cycle as in acceleration or deceleration, the ignition takes place at inadequate timing. The ignition sometimes takes place with excessive spark retard depending on the value of intake air flow rate. Such an inadequate ignition timing will result in misfire or knocking. FIG. 8 shows the result of experiment conducted on an actual car. As the solid line indicates, a misfire occurred in two cylinders, resulting in a change in torque. The change in torque worsens the drivability, while the misfire increases HC in the exhaust gas and fuel consumption.

Let us look at an embodiment of this invention. In this case, the control unit 15 executes processes of FIGS. 9A and 9B, which will be described later. For the same cycle of the same cylinder, interruption tasks $IRQ_1$ and $IRQ_2$ are calculation processes executed by using the same data, and in this case, optimum ignition timing data $ADV_1$ is given to the basic injection pulse width. Therefore, according to this embodiment, even when a sudden change is occurring in data representing the operating condition of the engine due to acceleration, for example, ignition timing adequate for the basic injection quantity Tp (corresponding to load) is always given. As indicated by the dotted line in FIG. 8, a smooth and sufficient acceleration can be obtained without occurrence of a misfire.

Figure 9A:
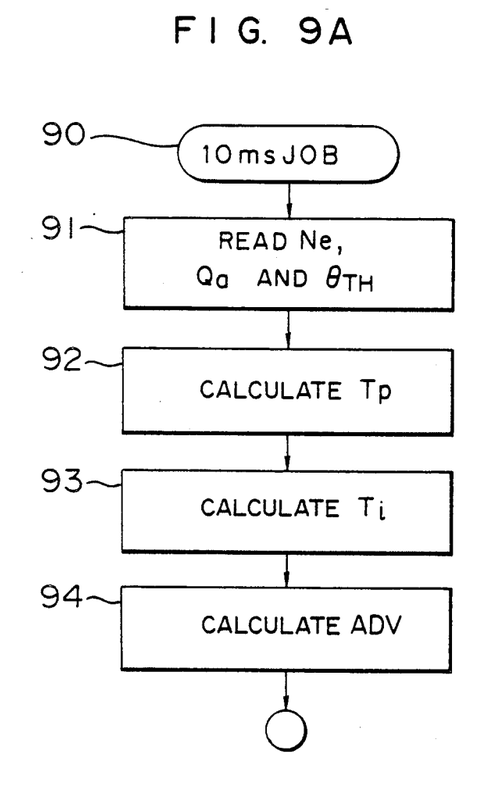
FIGS. 9A and 9B are flowcharts for explaining the operation of the first embodiment of this invention.

FIG. 9A shows the processes by the 10-ms task mentioned above. At the step 91, data is read in at 10-ms intervals, which includes the engine's intake air flow rate Qa, the number of revolutions Ne, and a throttle valve opening data $\theta_{th}$ from the throttle sensor 18. At the subsequent steps 92, 93, and 94, a basic pulse width Tp, an injection pulse width Ti, and ignition timing data ADV are calculated. Of these items, the ignition timing data ADV is obtained by retrieving it from the data map of FIG. 5, is updated successively by writing new data, and is stored in a specified memory such as a register.

Figure 9B:
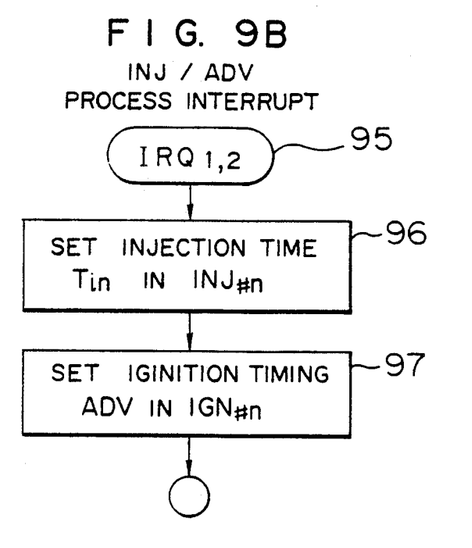

Referring to FIG. 9B, at the steps 96 and 97 for interruption tasks $IRQ_1$ and $IRQ_2$, data is set in the specified registers INJ#n and IGN#n for control purposes so that the injection quantity and the ignition timing are controlled by data at the same sampling time. Incidentally, n indicates a cylinder number.

Therefore, according to this embodiment, since the control operation shown in FIG. 2 is executed securely, even during a transient period of acceleration, for example, accurate ignition timing control can be performed at all times, so that a misfire or knocking is prevented from occurring and a feeling of acceleration is sufficient.

A second embodiment of this invention will now be described.

When a control operation is performed to rapidly increase the engine speed as in acceleration of a car. It is desirable to quickly increase the fuel supply quantity in order to reduce any delay in response. A well-known measure for this purpose is to apply what is called interruption injection control.

Figure 10A:
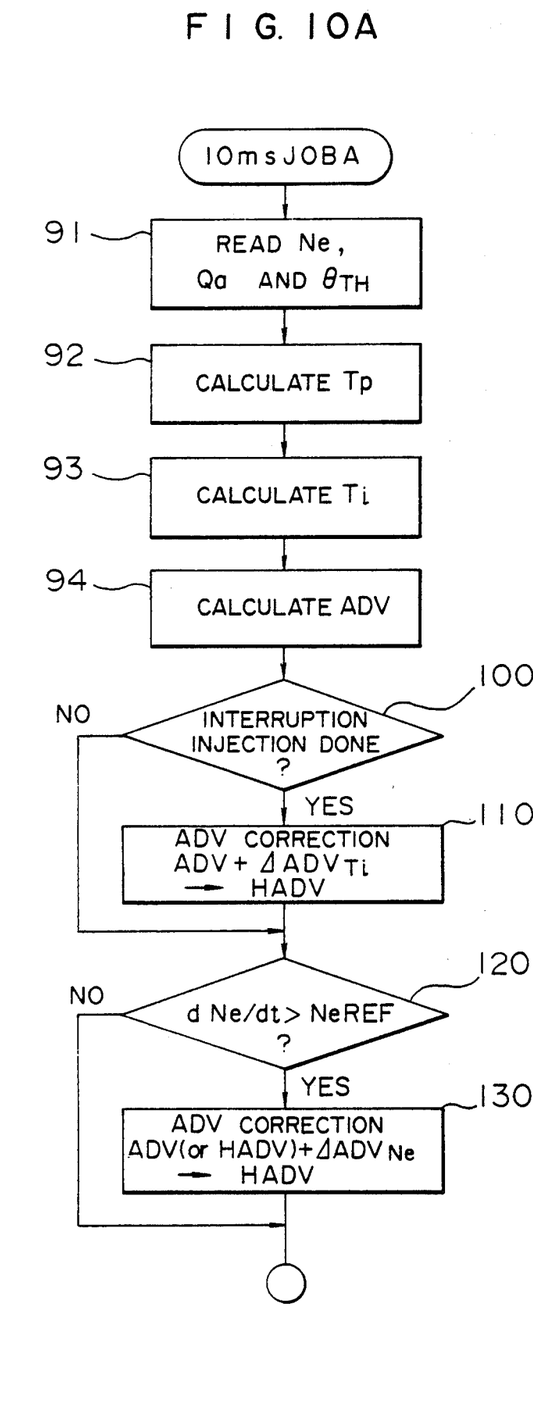
FIGS. 10A and 10B are flowcharts for explaining the operation of a second embodiment of this invention.
Figure 10B:
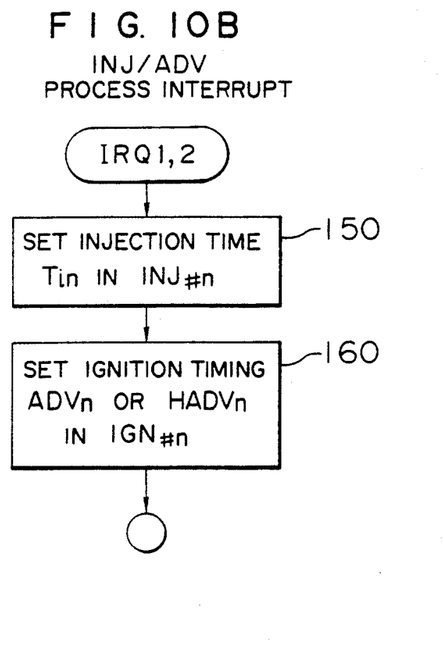

An embodiment shown in FIGS. 10A and 10B is a case where this invention is applied to an engine control system in which interruption injection control is implemented. This embodiment will be described as follows. The process by a 10-ms task shown in FIG. 10A is named a 10-ms job, and includes, steps 100, 110, 120, and 130, which are not included in the embodiment of FIG. 9A. Accordingly, the processes by interruption tasks $IRQ_1$ and $IRQ_2$, shown in FIG. 10B, are equivalent to the processes of FIG. 9B with some alterations made. These processes are executed by the control unit 15 according to the program. Description of the steps common to those in FIGS. 9A and 9B is omitted.

Figure 11:
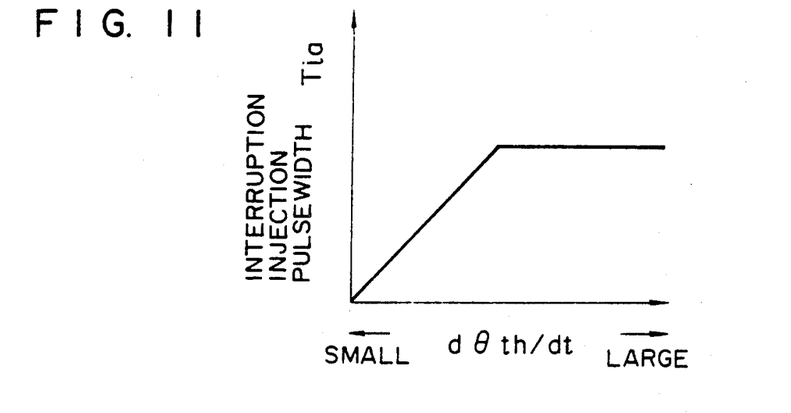
FIG. 11 is a control table of the interruption injection pulse width relative to the valve opening change rate.

In FIG. 10A, if an interruption injection is done with an auxiliary nozzle, not shown, at the decision step 100 a decision is made whether or not an interruption injection has been done. For example, this decision can be made by detecting the presence or absence of a valve opening drive signal to the auxiliary nozzle. A valve opening drive signal is generated by the control unit 15 in response to the change rate $\theta_{th}/dt$ of the throttle opening $\theta_{th}$ reaching a predetermined value. And, a value of an interruption injection pulse width Tia is decided which is an increment of acceleration corresponding to the value of the valve opening change rate $\theta_{th}/dt$ by referring to the table of FIG. 11, which is to be prepared and stored in the EP-ROM. If a decision is made that an interruption injection has been done, at the step 110 a spark-advance correction value $\Delta ADV_{Ti}$ adequate for the interruption injection pulse width Tia is decided, and the spark-advance correction value $\Delta ADV_{Ti}$ is added to an ignition timing data ADV calculated at the step 94 to obtain a corrected ignition timing data HADV.

Then the process moves on to the step 120 where a rise rate dNe/dt of the engine speed Ne owing to acceleration is detected, and a decision is made whether or not the detected value exceeds a predetermined value of NeREF. If the rise rate dNe/dt is greater than the predetermined value of NeREF, at the step 130, a spark advance correction value $\Delta ADV_{Ne}$ adequate for the rise rate dNe/dt is decided, and a spark advance correction process is performed by adding the spark advance correction value $\Delta ADV_{Ne}$ to the ignition timing data ADV obtained at the step 94 or to the corrected ignition timing data HADV obtained at the step 110 to find a corrected ignition timing data HADV.

In the processes by the interruption tasks $IRQ_1$ and $IRQ_2$, at the step 150 an injection pulse width Tin is set in a register INJ#n. At the same time, an interruption injection pulse width Tia for an increment of acceleration is set in a register. In addition, at the step 160, either an ignition timing data ADVn (n indicates a cylinder No.) decided at the step 94 or corrected ignition timing data HADVn decided at the step 110 or 130 is set in a register IGN#n.

Figure 12:
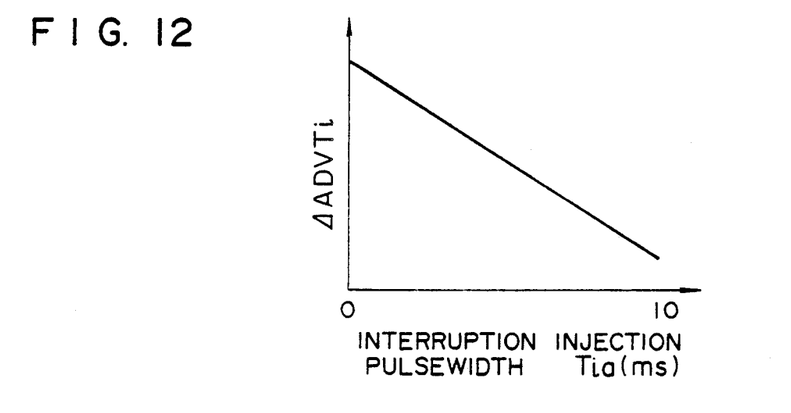
FIGS. 12 and 13 are characteristic diagrams serving as control tables.

The corrected injection timing HADV at the step 110 is calculated by obtaining a correction amount $\Delta ADV_{Ti}$ by retrieving it from a characteristics table, shown in FIG. 12 and stored in the EP-ROM, by the interruption injection pulse width Tia, and by correcting the ignition timing data ADV by using the correction amount $\Delta ADV_{Ti}$ with the following equation.

$$HADV = ADV + \Delta ADV_{Ti}$$

Figure 13:
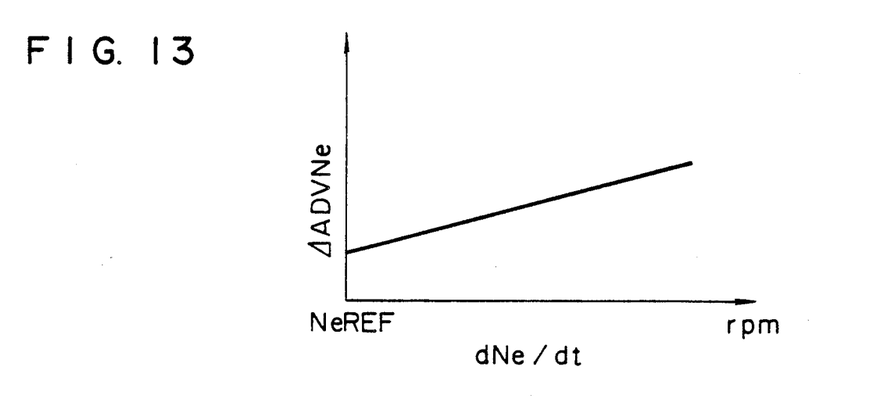

Calculation of a corrected ignition timing HADV due to a degree of increase in the number of revolution after the engine is accelerated at the step 130 is performed as follows. A correction amount $\Delta ADV_{Ne}$ is retrieved from a characteristics table, shown in FIG. 13 and stored in the EP-ROM, by a change rate dNe/dt of the engine's number of revolutions per unit time and the ignition timing data ADV or HADV is corrected by using the correction amount $\Delta ADV_{Ne}$ with the following equation.

$$HADV = ADV + \Delta ADV_{Ne} \text{ or}$$

$$HADV = HADV \text{ (step 110)} + \Delta ADV_{Ne}$$

Correction processes are not limited to the two corrections mentioned above, but one of them may be used.

According to the embodiment shown in FIG. 10, as correction attending acceleration is carried out, an accurate spark advance correction for ignition timing is performed at all times. Misfire or knocking can be prevented reliably, and while an actual feeling of acceleration is sufficient, a smooth and stable acceleration can be obtained easily.

According to this invention, in an engine having a plurality of cylinders, ignition is timed to accurately comply with the fuel supply quantities to the individual cylinders, so that it is possible to substantially suppress the occurrence of misfire or knocking when the engine is accelerated, easily provide an excellent feeling of acceleration and a stable comfort to ride in, and significantly improve the drivability and the emission control performance.

We claim:

1. A method for determining controlled variables of each cylinder in a control system of a multicylinder internal combustion engine wherein the control variables are determined independently for each cylinder according to data representing the operating condition of the engine, while said data is being detected at predetermined timing, said method comprising the steps of:
   detecting data representing the condition of the engine, including at least intake air quantity and engine speed;
   storing said data in memory means;
   detecting that said engine has been accelerated when a throttle valve opening variation per unit time of said engine exceeds a predetermined value;
   determining as a first controlled variable a basic fuel flow rate at which the fuel is supplied to the cylinders of said engine at a certain time of a certain stroke of each said cylinder according to the data in said memory means;
   determining as a second controlled variable the ignition timing of each cylinder at a time after said certain time in said stroke according to the same data of said memory means;
   determining an acceleration increment of the fuel flow in response to detection of said acceleration by determining an increment of supplied fuel according to the value of said throttle valve opening variation; and
   determining a first correction value for the ignition timing according to the increment of said supplied fuel.

2. A method according to claim 1, wherein determining said ignition timing comprises a step of determining the ignition timing of each said cylinder by referring to a data map showing the correspondence between basic fuel flow rate and engine speed vs. optimum ignition timing.

3. A method according to claim 1, wherein said step of detecting data representing said operating condition comprises a step of detecting a rise rate of the engine speed when the acceleration of said engine is detected, and wherein said method further comprises a step of determining the second correction value of the ignition timing according to said rise rate.

4. A method according to claim 3, wherein said steps of determining said first and second correction values comprise steps of determining said first and second correction values by referring to the corresponding data, "the increment vs. the first correction value" and "the rise rate vs. the second correction value", which data is to be prepared in advance.

5. A method according to claim 4, said step of determining said ignition timing comprises step of obtaining controlled ignition timing of each said engine cylinder by adding said first and second correction values to the ignition timing obtained from said data maps.

* * * * *